United States Patent Office
3,153,098
Patented Oct. 13, 1964

3,153,098
BIS PHENOLS
James C. Boag, Detroit, Mich., assignor to Ethyl Corporation, New York, N.Y., a corporation of Virginia
No Drawing. Filed May 28, 1959, Ser. No. 816,399
3 Claims. (Cl. 260—620)

The present invention deals in general with a novel class of compounds and their use as antioxidants. More particularly, this invention is concerned with a novel and unusual class of substituted phenolic compounds and the employment of these compounds as stabilizers and antioxidants for organic material.

It is the object of this invention to provide a novel class of chemical compounds. A further object of this invention is to provide novel compositions of matter comprising organic material stabilized against oxidative deterioration. A particular object of this invention is to provide high molecular weight unsaturated polymers of enhanced stability.

These and other objects are accomplished by a compound having the formula:

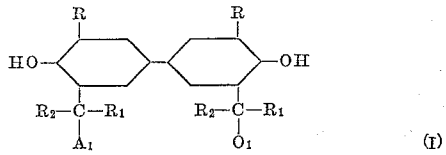

where R is an organic hydrocarbon radical having from one to about 22 carbon atoms, $R_1$ is an alkyl radical having from one to three carbon atoms, $R_2$ is selected from the group consisting of hydrogen and alkyl radicals having from one to three carbon atoms and $A_1$ is an aromatic hydrocarbon radical having from six to about 12 carbon atoms. Examples of the compounds of this invention include:

4,4'-bis[2-tert-actyl-6-(α-ethyl-α-methylbenzyl)phenol],
4,4'-bis[2-seceicosyl-6-(α-methylbenzyl)phenol],
4,4'-bis[2-(α,α-diisopropyl-p-nonylbenzyl)-6-(α,α-di isopropyl-p-ethylphenylbenzyl)phenol],
4,4'-bis[2-tert-amyl-6-(α,α-dimethylbenzyl)phenol],
4,4'-bis[2-methyl-6-(α-ethylbenzyl)phenol],
4,4'-bis[2-ethyl-6-(α-diethyl-3-isobutylbenzyl)phenol],
4,4'-bis[2-tert-butyl-6-(α-propyl-4-phenylbenzyl)phenol],
4,4'-bis[2-isopropyl-6-(α,α-dipropyl-3-hexylbenzyl) phenol],
4,4'-bis[2-hexyl-6-(α-ethyl-α-methylbenzyl)phenol],
4,4'-bis[2,6-di-(α,α-diethyl-4-methylbenzyl)phenol].

A preferred embodiment of this invention is a compound having the formula:

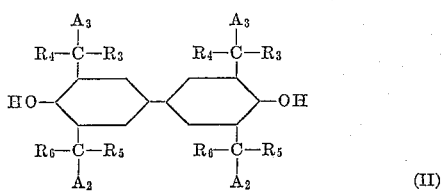

where $R_3$ and $R_5$ are alkyl radicals having from one to three carbon atoms, $R_4$ and $R_6$ are selected from the class consisting of hydrogen and the methyl group, and $A_2$ and $A_3$ represent aromatic hydrocarbon radicals having from six to about 12 carbon atoms. Among the compounds represented by this preferred embodiment are: 4,4'-bis[2,6-di-(α,α-dimethylbenzyl)phenol], 4,4'-bis[2,6-di-(α-ethyl-2-isopropylbenzyl)phenol], 4,4'-bis[2,6-di-(α-methylbenzyl)phenol], 4,4'-bis[2-(α-methylbenzyl)-6-(α,α-dimethylbenzyl)phenol]. A particularly preferred embodiment of this invention consists of compounds of the above formula where $R_3$ and $R_5$ are methyl groups. Thus, 4,4'-bis[2,6-di-(α-methylbenzyl)phenol], 4,4'-bis[2,6-di-(α,α-dimethylbenzyl)phenol] and 4,4'-bis[2-(α-methylbenzyl-6-(α,α-dimethylbenzyl)phenol] represent particularly preferred compounds of this invention. These compounds are preferred because of their unusual antioxidant activity and the fact that they are easily prepared from readily available starting materials.

Another preferred embodiment of this invention consists of those compounds in which R, in the formula first appearing above, is an alkyl group having from one to four carbon atoms, $R_1$ is hydrogen or a methyl group and $R_2$ is a methyl group. The particularly preferred alkyl groups represented by R are the methyl group, the isopropyl group and the tertiary butyl group. Examples of these preferred compounds are:

4,4'-bis-[6-(α-methylbenzyl)-o-cresol],
4,4'-bis-[2-(α,α-dimethylbenzyl)-6-tert-butylphenol],
4,4'-bis-[6-(α,α-4-trimethylbenzyl)-o-cresol],
4,4'-bis-[2-(α-methyl-m-xylyl)-6-tert-butylphenol],
4,4'-bis-[6-(α,α-3,4,5-pentamethylbenzyl)-o-cresol],
4,4'-bis-[2-isopropyl-6-(α-methyl-2-ethylbenzyl)phenol].

The novel compounds of this invention are particularly well suited as additives to organic material and particularly to high molecular weight elastomers as antioxidants. When thus employed the compounds have the desirable properties of low volatility and high stability. These properties are important in applications such as preserving rubber from oxidation. High volatility compounds tend to dissipate during rubber processing which is conducted at high temperatures. Thus, for an antioxidant to be effective, it must have low volatility and high temperature stability.

The compounds of this invention are readily prepared by oxidizing a phenol which is substituted in the 2 and 6 position with appropriate groups, to the diphenoquinone and subsequently reducing the diphenoquinone to the corresponding 4,4'-bis-(2,6-di-substituted phenol). For example, 4,4'-bis[6-(α-methylbenzyl)-o-cresol] is conveniently prepared by oxidizing 6-(α-methylbenzyl-o-cresol and subsequently reducing the thus prepared diphenoquinone to the desired compound.

The 2,6-di-substituted phenolic starting materials in this process have the formula:

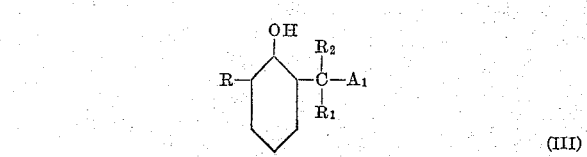

where R, $R_1$, $R_2$ and $A_1$ are as defined above. These compounds are themselves prepared by reacting a phenol having the hydrogen atom on a carbon atom ortho to the hydroxyl group with an olefinic compound having an aromatic hydrocarbon radical bonded to one of the unsaturated carbon atoms, in the presence of an aluminum phenoxide catalyst. For example 6-(α-methylbenzyl)-o-cresol is conveniently prepared for reacting ortho cresol with styrene in the presence of a small amount of aluminum o-cresoxide. This process is more fully described in application Serial No. 751,847, filed July 30, 1958, now Patent No. 3,075,832 and still further in a patent application filed March 26, 1959, by Alfred J. Kolka and George G. Ecke entitled Compositions of Matter, Serial No. 801,998.

A wide range of oxidizing agents may be employed in preparing the diphenoquinone precursers of the compounds of this invention. For example, such oxidizing agents as ferric chloride, nitric acid and chromic acid are conveniently employed. In addition such oxidizing agents as air, oxygen, hydrogen peroxide, various organic peroxides, potassium chlorate and potassium permanganate may be employed.

Reduction of the diphenoquinone is readily accomplished by the use of such reducing agents as zinc and acetic acid, stannous chloride and the like. The reduction of the diphenoquinone to the corresponding bisphenol may also be accomplished by catalytic processes employing hydrogen. Such catalysts as nickel-nickel oxide and palladium chloride on charcoal are profitably employed as hydrogenation catalysts.

In the oxidation step, a wide range of temperature conditions may be employed. The reaction proceeds from about 40° C. and may be conducted up to about 150° C. However, temperatures in the range of 90 to 110° C. are preferred as high yields of diphenoquinone are produced over this range with a minimum of undesirable side reactions and the reaction may be conducted in readily available simple equipment.

Similarly, a wide range of conditions may be used in the reduction of the diphenoquinone.

The following examples illustrate the compounds of this invention and their preparation:

EXAMPLE I

In a reaction vessel fitted with heating means, reflux condenser and means for agitation was placed 60 parts of 2,6-di-($\alpha$-methylbenzyl)phenol, 600 parts of methanol as a solvent, 200 parts of acetic acid and 70 parts of sodium dichromate in 100 parts of water. The mixture was stirred and heated at reflux for two hours. During the course of the reaction, a heavy red oil slowly separated from the solution. This red oil, 3,3',3,5'-tetra-($\alpha$-methylbenzyl)-4,4'-diphenoquinone was completely separated from the reaction mixture by addition of 2,000 parts of water and subsequent separation. The oil was water washed and returned to the reaction vessel along with 500 parts of methanol and 200 parts of concentrated hydrochloric acid. The resulting mixture was brought to reflux and powdered zinc was slowly added until a pale yellow solution resulted. After dilution with water, a heavy oil separated which was recovered and stripped of unreacted 2,6-di-($\alpha,\alpha$-methylbenzyl)phenol at up to 182° C. at 0.5 mm. of mercury. The resulting product was cooled and ground to a light yellow powder. Infrared analysis showed that this product was 4,4'-bis-[2,6-di-($\alpha$-methylbenzyl)phenol].

EXAMPLE II

In a reaction vessel equipped with heating means, means for agitation and means for passing gaseous reactants through a reaction mixture is charged 60 parts of 2,6-di-($\alpha,\alpha$-dimethylbenzyl)phenol, 300 parts of ethanol and 20 parts of sodium hydroxide. This mixture while under agitation is treated with gaseous oxygen and the temperature is raised to 60° C. This oxygen treatment is continued for 6½ hours after which time the reaction mixture is cooled and made acid by the addition of 100 parts of acetic acid. The temperature is then raised to reflux and 15 parts of powdered zinc are slowly added. During the zinc addition, the color of the solution turns from deep red to light yellow. This reaction results in a good yield of 4,4'-bis[2,6-di-($\alpha,\alpha$-dimethylbenzyl)phenol].

EXAMPLE III 4,4' - bis[2 - tert-butyl-6-($\alpha$-ethyl-$\alpha$-propylbenzyl)phenol] is conveniently prepared by oxidizing 2-tert-butyl-6-($\alpha$-ethyl-$\alpha$-propylbenzyl)phenol with ferric chloride using isopropanol as a solvent. During this oxidation the reaction mixture is kept acid through the use of acetic acid. This oxidation results in the di-phenoquinone of the phenol employed. To reduce this diphenoquinone to the desired bis phenol a nickel-nickel oxide catalyst is employed. The catalyst is added to the reaction mixture which is raised to 40° C. and hydrogen is slowly bubbled through the mixture until the color of the diphenoquinone has completely disappeared.

EXAMPLE IV

The procedure of Example III is followed using 6-($\alpha$-methylbenzyl)-o-cresol as the starting phenol. The catalytic hydrogenation is conducted by employing palladium chloride on charcoal as catalyst. This reaction results in a high yield of 4,4'-[6-($\alpha$-methylbenzyl)-o-cresol].

EXAMPLE V

Example II is repeated using 2-ethyl-6-($\alpha$-ethyl-$\alpha$-methylbenzyl)phenol as the starting phenol. The oxidizing agent is supplied by rapidly bubbling air through the reaction mixture at the elevated temperature. Upon reduction with zinc in acid solution a good yield of 4,4'-bis[2-ethyl-6-($\alpha$-methylbenzyl)phenol] is obtained.

EXAMPLE VI

Example I is repeated employing 2-tert-octyl-6-$\alpha,\alpha$-diethyl-p-octylbenzyl)phenol. This reaction results in a good yield of 4,4'-bis[2-tert-octyl-6-($\alpha,\alpha$-diethyl-p-octylbenzyl)phenol].

EXAMPLE VII 4,4' - bis[2-isopropyl-6-($\alpha,\alpha$-diethylbenzyl)phenol] is prepared from 2-isopropyl-6-($\alpha,\alpha$-dimethylbenzyl)phenol by the procedure employed in Example I.

Another part of this invention consists of bis phenol compounds prepared from a mixture of phenols, at least one of which is a phenol as defined by Formula III above. The mixture preferably contains at least about 20 mole percent of such a phenol, and the balance contains phenols which will oxidatively couple to a diphenoquinone. Thus, in addition to the phenol defined by Formula III above, the mixture contains at least 10 mole percent of a phenol having the formula:

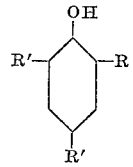

where R is as defined above and R' is R or hydrogen, such that at least one R' is R. When these mixtures of phenols are reacted to form diphenoquinones, a mixture of several products results, and upon reduction to the bisphenol, a product is obtained which contains a substantial portion of an unsymmetrical bis phenol of the formula:

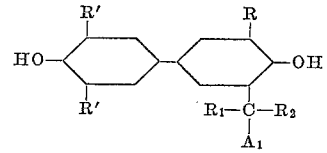

or

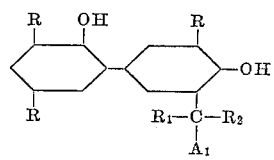

These asymmetric bis phenols may be separated from the reaction mixture, or may be used without separation. In both cases they are valuable antioxidants characterized by a higher degree of solubility in most organic media. This part of the invention is illustrated by the following preparative examples.

EXAMPLE VIII

The process of Example I is conducted using 26 parts of 2,6-di-tert-butylphenol and 34 parts of 2,6-di-($\alpha$-methylbenzyl)phenol as starting materials. The product contains a substantial amount of 3,5-di-tert-butyl-3',5'-di-(α-methylbenzyl)-4,4'-dihydroxydiphenyl.

EXAMPLE IX

An equimolar mixture of 6-tert-butyl-o-cresol and 6-(α,α-dimethylbenzyl)-o-cresol is reacted as outlined in Example II. The product contains 4,4'-bis-(6-tert-butyl-o-cresol), 4,4'-bis[6-(α,α-dimethylbenzyl)-o-cresol] and 3,3' - dimethyl - 5-tert-butyl-5'-(α,α-dimethylbenzyl)-4,4'-dihydroxydiphenyl.

EXAMPLE X o - Isopropylphenol and 2-(α-methylbenzyl)-6-(α,α-dimethylbenzyl)-phenol in 1:9 molar ratio are reacted by the process of Example I to produce a mixture having excellent antioxidant activity.

Other asymmetric compounds according to this invention include: 2,4'-dihydroxy-6-ethyl-3',5'-di-(α-methylbenzyl) - diphenyl, 4,4'-dihydroxy-2,3'-di-tert-butyl-5'-(α - ethylbenzyl)-diphenyl, 4,4'-dihydroxy-3,3',5-tri-(α,α-dimethylbenzyl)-5'-(α-propylbenzyl)-diphenyl and similar compounds.

The compounds of this invention are outstanding antioxidants. Therefore, an embodiment of this invention is a new composition of matter which comprises organic material normally tending to undergo oxidative deterioration in the presence of air, oxygen or ozone, containing a small antioxidant quantity, up to about five percent, of a compound of this invention as described in Formulas I and II above. A preferred embodiment of this invention consists of organic material containing those compounds in which R in Formula I above is an alkyl group having from one to four carbon atoms. In this class of compounds, the particularly preferred compounds are those in which R is a methyl or tertiary butyl group. These compounds are particularly preferred since they tend to exhibit the most desirable properties and are readily prepared.

The compounds of this invention find important utility as antioxidants in a wide variety of oxygen sensitive materials. Thus, liquid hydrocarbon fuels such as gasoline, kerosene and fuel oil are found to possess increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils; waxes, soaps and greases; plastics; synthetic polymers such as polyethylene and polypropylene; organometallic compositions such as tetraethyllead and tetraethyllead antiknock fluids; elastomers, including natural rubber; crankcase lubricating oils; lubricating greases; and the like, greatly increase their resistance to deterioration in the presence of air, oxygen or ozone.

The compounds of this invention are also very useful in protecting petroleum wax—paraffin wax and microcrystalline wax—against oxidative deterioration.

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus, a preferred embodiment of the present invention is a rubber containing as an antioxidant therefor, 4,4'-bis-(2,6 - di - substituted phenol) as defined above. Another part of this invention is the method of preserving rubber which comprises incorporating therein a 4,4'-bis-(2,6-di-substituted phenol) of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and co-polymers exemplified by the butadiene-styrene (GR–S) and butadiene-arcylonitrile (GR–N or Paracril) rubbers and the like, although the invention is applicable to the stabilization of any rubber, high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Furthermore, the novel stabilizer is relatively inexpensive and easily prepared, and possesses the highly beneficial property of low volatility. As is well known, a high desirable feature of a rubber antioxidant is that it have a low volatility so that it remains admixed with the rubber during vulcanization and related process steps.

Furthermore, the compounds of this invention impart excellent non-discoloration and non-staining characteristics to the rubber in which they are employed. In the manufacture of rubber items where a light colored rubber portion exists adjacent to a dark colored portion it is necessary that there be no migration of pigment from the dark to the light parts of the object. Thus, manufactures of white sidewall tires must be sure that any antioxidant used in the white portion is non-staining and that any antioxidant used in the black portion will not migrate into the white portion and carry with it pigments which will discolor the white portion of the tire. In such applications, the compounds of this invention have a marked advantage.

The rubber compositions of the present invention are illustrated by the following specific examples wherein all parts and percentages are by weight.

EXAMPLE XI

To illustrate the enhanced oxygen resistance of the rubber compositions of this invention and their excellent non-staining and non-discoloration characteristics, a light-colored stock is selected for test. This stock had the following composition:

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
| | 181.12 |

To the above base formula is added one part by weight of 4,4'-bis[2,6-bis(α-methylbenzyl)phenol] and individual samples are cured for 20, 30, 45 and 60 minutes at 274° C. using perfectly clean molds with no mold lubricant. Another set of samples of the same base formula which do not contain an antioxidant are cured under the same conditions.

To demonstrate the protection afforded to the rubber by the practice of this invention, the tensile strength and the ultimate elongation of stocks prepared by the addition of the inhibitor are determined before and after aging. These properties are also determined on the inhibitor-free stocks. The aging is accomplished by conducting the procedure of ASTM Designation: D–572–52, described in the ASTM Standards for 1952, Part 6, for a period of 168 hours at a temperature of 70° C. with an initial oxygen pressure in the test bomb of 300 p.s.i.g.

The tensile strength and the ultimate elongation of the test specimens before and after aging are measured by ASTM Test Procedure, D–412–51T (ASTM Standards for 1952, Part 6). The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance.

Measurements are also made of the increase in weight of the test specimens which occur during the accelerated aging. This is a direct measure of the oxygen up-take of the samples and provides another criterion of the effectiveness of an inhibitor in suppressing oxidative deterioration of the rubber. Thus, the larger the weight increase, the greater is the deterioration and the less is the inhibitor.

In all of the above tests, the composition compounded with 4,4′-bis[2,6-bis($\alpha$-methylbenzyl)phenol] gives results which show this additive to be an excellent antioxidant.

EXAMPLE XII

To a synthetic rubber master batch comprising 100 parts of GR–S rubber having an average molecular weight of 60,000, 50 parts of mixed zinc propionate-stearate, 50 parts of carbon black, five parts of road tar, two parts of sulfur and 1.5 parts of mercaptobenzothiazole is incorporated 1.5 parts of 4,4′-bis[6-($\alpha,\alpha$-dimethylbenzyl)-o-cresol]. This batch is then cured for 60 minutes at 45 p.s.i. of steam pressure.

EXAMPLE XIII

Natural rubber stock is compounded according to the following formula:

| | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 4,4′-bis[2,6-bis($\alpha,\alpha$-dimethylbenzyl)phenol] | 1 |
| Benzothiazyl disulfide | 0.4 |
| Amine activator | 0.5 |

This stock is then vulcanized for 60 minutes at 280° F.

EXAMPLE XIV

A butadiene-acrylonitrile copolymer is produced from butadiene-1,3 and 32 percent of acrylonitrile. Two percent (based on the dry weight of the copolymer) of 4,4′-bis[6-($\alpha$-methylbenzyl)-o-cresol] is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

EXAMPLE XV

Three percent of 4,4′-bis[2,6-bis($\alpha$-methylbenzyl)phenol] emulsified in sodium oleate is added to a rubber-like copolymer of butadiene-1,3 and styrene containing 25 percent of combined styrene.

EXAMPLE XVI

A rubber stock is compounded from 100 parts of smoked sheet rubber, 60 parts of zinc oxide, 20 parts of lithopone, 2 parts of sulfur, 0.7 part of diphenyl guanidine phthalate, 0.8 part of benzoyl thiobenzothiazole, 0.2 part of paraffin and 2 parts of 4,4′-bis[2-($\alpha,\alpha$-dimethylbenzyl)-6-tert-butylphenol]. The stock so compounded is cured by heating for 45 minutes at 126° C. in a press.

EXAMPLE XVII

Two parts of 4,4′-bis[2-($\alpha$-ethyl-4-methylbenzyl)-6-ethylphenol] are incorporated in 100 parts of raw butyl rubber prepared by the copolymerization of 90 percent of isobutylene and 10 percent of isoprene.

EXAMPLE XVIII

To 200 parts of raw butyl rubber prepared by copolymerization of 95 percent of isobutylene and 5 percent of butadiene is added 1.5 parts of the product of Example X.

EXAMPLE XIX

To a master batch of GR–N synthetic rubber comprising 100 parts of GR–N rubber, 5 percent of zinc stearate, 50 parts of carbon black, 5 parts of road tar, 2 parts of sulfur and 2 parts of mercaptobenzothiazole is added 5 percent based on the weight of the batch of 4,4′-bis[6-($\alpha,\alpha$-dimethylbenzyl)-o-cresol].

EXAMPLE XX

To natural rubber (Hevea) is added 0.1 percent of the product of Example VIII.

Each of the above illustrated rubber compositions of this invention possesses greatly improved resistance against oxidative deterioration as compared with the corresponding rubber compositions which are devoid of an antioxidant. Moreover, the light-colored stocks of the above examples exhibit virtually no discoloration or staining characteristics even when subjected to severe weathering conditions and the like. The methods of formulating the improved rubber compositions of this invention will now be clearly apparent to those skilled in the art.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress and the like, the use of relatively high concentrations of this inhibitor is advantageous. On the other hand, when the article of manufacture is not to be subjected to such severe conditions, relatively low concentrations can be successfully utilized. Generally speaking amounts ranging from about 0.1 to about 3 percent by weight give uniformly satisfactory results.

Other rubbers and elastomers which can be preserved according to this invention are the rubbery polymerizates of isoprene, butadiene-1,3, piperylene; also the rubbery copolymer of conjugated dienes with one or more polymerizable monoolefinic compounds which have the capability of forming rubbery copolymers with butadiene-1,3, outstanding examples of such monoolefinic compounds being those having the group $CH_2\!=$, exemplified by styrene. Examples of such monoolefins are styrene, vinyl naphthalene, alpha methyl styrene, p-chlorostyrene, dichlorostyrene, acrylic acid, methyl acrylate, methyl methacrylate, methacrylonitrile, methacrylamine, methyl vinyl ether, methyl vinyl ketone, vinylidine chloride, vinyl carbazole, vinyl pyridine, alkyl-substituted vinyl pyridines, etc. In fact, excellent stabilization is achieved by incorporating a compound of this invention in any of the well known elastomers which are normally susceptible to deterioration in the presence of air, such as elastoprenes, elastolenes, elastothiomers, and elastoplastics.

As pointed out above, the compounds of this invention are effective antioxidants when added to other organic compositions normally tending to undergo deterioration in the presence of air, oxygen or ozone. The following examples illustrate various embodiments of this aspect of the invention.

EXAMPLE XXI

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 4,4'-bis[2,6-bis($\alpha,\alpha$-dimethylbenzyl)phenol] to prepare a composition of outstanding oxidative stability.

EXAMPLE XXII

A linear polyethylene having a high degree of crystallinity, up to 93 percent, and below 1 ethyl branched chain per hundred carbon atoms, a density of about 0.96 gram per milliliter and which has about 1.5 double bonds per hundred carbon atoms, is treated with $50 \times 10^{-6}$ roentgens of $\beta$-radiation. To the thus irradiated polymer is added 0.005 percent of 4,4'-bis[6-($\alpha$-methylbenzyl)-o-cresol] and the resulting product has better stability characteristics.

EXAMPLE XXIII

Two parts of the product of Example IX are added with milling to 100 parts of a low density polyethylene prepared by high pressure polymerization and which has an average molecular weight of 18,000 to 20,000. The resulting product is vastly improved in its oxidative stability.

EXAMPLE XXIV

To 10,000 parts of a polyethylene having an average molecular weight of about 100,000 and which has a tensile strength of 5400 p.s.i., a Shore D hardness of 70 and a softening temperature of 130° C. under low load, is added 10 parts of 4,4'-bis[2,6-bis($\alpha$-methylbenzyl)phenol] to prepare a composition of outstanding oxidative stability.

Liquid hydrocarbon fuels employed in the operation of spark ignition combustion engines are also vastly improved in their storage stability by the practice of this invention. Table I, below, gives the compositions of a number of typical commercial gasolines which may be stabilized against oxidative deterioration by the inclusion therein of a compound of this invention.

Table I

GASOLINE COMPOSITIONS

| Gasoline | Percent Aromatics | Percent Olefins | Percent Saturates | Gravity, °API |
|---|---|---|---|---|
| A | 26.6 | 20.8 | 52.6 | 62.1 |
| B | 8.6 | 7.9 | 83.5 | 68.5 |
| C | 20.0 | 41.2 | 38.8 | 62.9 |
| D | 20.5 | 32.9 | 46.6 | 63.5 |
| E | 38.1 | 7.3 | 54.6 | 59.3 |

EXAMPLE XXV

To 1,000 parts of Gasoline A, as described in Table I, is added 10 parts of 4,4'-bis[6-($\alpha,\alpha$-dimethylbenzyl)-o-cresol].

EXAMPLE XXVI

To 10,000 parts of Gasoline B is added 500 parts of 4,4'-bis[6-($\alpha$-methylbenzyl)-o-cresol].

EXAMPLE XXVII

To 10,000 parts of Gasoline C is added one part of the product of Example VIII.

Most gasolines in commercial use also contain an organometallic antiknock agent and certain scavengers therefor. The antiknock agent most frequently employed is tetraethyllead. The scavengers are ordinarily halohydrocarbon compounds of chlorine and bromine. Most widely used of these are ethylene dibromide and ethylene dichloride. In addition, gasolines often contain other additives such as dyes and phosphorus containing corrective agents. These gasoline compositions containing additives are also protected against oxidative deterioration by the practice of this invention as demonstrated by the following examples.

EXAMPLE XXVIII

To 10,000 parts of Gasoline D, which contains 2.39 g./gal. of tetraethyllead and one theory of bromine as ethylene dibromide, is added 100 parts of 4,4'-bis[2,6-di-($\alpha,\alpha$-diisopropylbenzyl)phenol].

EXAMPLE XXIX

To 1,000 parts of Gasoline E, which contains 2.47 g./gal. of lead as tetraethyllead, one theory of chlorine as ethylene dichloride, 0.5 theory of bromine as ethylene dibromide and 0.2 theory of phosphorus as tris-($\beta$-chloroisopropyl)thionophosphate, is added 5 parts of 4,4'-bis[6-($\alpha$-ethyl-$\alpha$-propyl-p-nonylbenzyl)-o-cresol].

The tetraethyllead antiknock additive is supplied to oil companies as a mixture already containing the necessary dyes and scavengers. These mixtures, which are commonly known as antiknock fluid compositions, are also protected against oxidative deterioration by the practice of this invention.

EXAMPLE XXX

To an antiknock fluid composition which is to be used as an additive to gasoline and which contains 61.5 parts of tetraethyllead, 17.9 parts of ethylene dibromide and 18.8 parts of ethylene dichloride is added with agitation 1.3 parts of 4,4'-bis[2,6-bis($\alpha$-methylbenzyl)phenol]. The resulting composition is stable for long periods when exposed to air.

EXAMPLE XXXI

To 1,000 parts of commercially available diesel fuel having an octane number of 51.7 and a 50 percent evaporation temperature of 509° F. is added 3 parts of 4,4'-bis[6-($\alpha$-methylbenzyl)-o-cresol]. The resulting fuel is stable to oxidative deterioration.

The compounds of this invention are also useful in preventing oxidative deterioration in lubricating oil compositions. Thus, an embodiment of this invention is a lubricating oil normally susceptible to oxidative deterioration containing a small antioxidant quantity, up to 5 percent, of a compound of this invention as defined above.

To prepare the lubricants of this invention, an appropriate quantity—from about 0.001 to about 5 percent and preferably from about 0.25 to about 2 percent—of the compound of this invention is blended with the base oil to be protected. Suitable base oils include mineral oils and also synthetic diester oils, such as sebacates, adipates, etc. which find particular use as aircraft instrument oils, hydraulic and damping fluids and precision bearing lubricants. All of these base oils are normally susceptible to oxidative deterioration, especially at elevated temperatures.

The finished lubricants of this invention have much greater oxidation stability and many other improved performance characteristics as compared with the corresponding base oils.

The following examples illustrate the preferred lubricating oil compositions of this invention.

EXAMPLE XXXII

To 1,000 parts of a solvent refined neutral oil (95 VI and 200 SUS at 100° F.) containing 6 percent of a commercial methacrylate type VI approver which gives the finished formulation of a VI of 140 and a viscosity of 300 SUS at 100° F. is added 5 percent of 4,4'-bis[6-($\alpha$,$\alpha$-dimethylbenzyl)-o-cresol].

EXAMPLE XXXIII

To an additive-free solvent refined crankcase lubricating oil having a viscosity index of 95 and a SAE viscosity of 10 is added 0.001 percent of 4,4'-bis[2,6-di-($\alpha$,$\alpha$-dimethylbenzyl)phenol].

EXAMPLE XXXIV

To 100,000 parts of a petroleum hydrocarbon oil having a gravity of 30.3° API at 60° F., a viscosity of 178.8 SUS at 100° F., a viscosity index of 154.2 and which contains 0.2 percent sulfur, is added 200 parts of 4,4'-bis[2-($\alpha$,$\alpha$-diethyl-p-methylbenzyl) - 6 - tert-butylphenol]. The resulting oil possesses greatly enhanced resistance to oxidative deterioration.

EXAMPLE XXXV

To 100,000 parts of a commercially available pentaerythritol ester having a viscosity at 100° F. of 22.4 centistokes, and known in the trade as "Hercoflex 600" is added 400 parts (0.4 percent) of 4,4'-bis[2,6-di-($\alpha$-methylbenzyl)phenol]. The resulting finished oil possesses markedly improved resistance against oxidative deterioration.

EXAMPLE XXXVI

To 100,000 parts of dioctyl sebacate having a viscosity of 210° F. of 36.7 SUS, a viscosity index of 159 and a molecular weight of 426.7 is added 250 parts (0.25 percent) of 4,4'-bis[6-($\alpha$-methylbenzyl)-o-cresol].

To illustrate the benefits obtained by the practice of this invention, a standard oil oxidation test is used. The equipment and test procedure described by Kroger et al., Erdol and Kohle, 2, page 398 (1949) served as a basis for the tests. The equipment and procedures are slightly modified in order to make the oxidizing conditions more strenuous. In this manner the test lubricants are subjected to severe oxidizing conditions in order to conclusively establish the effectiveness of additives under very adverse conditions. Furthermore, the modifications are found to provide results which correlated extremely well with test results of other standard procedures, including actual engine tests.

The equipment consists of a reaction cell connected with an open end manometer whereby the total uptake of oxygen by the oil is determined by noting the drop in height of the mercury in the manometer. The test oil sample is placed in the reaction cell which is then flushed with oxygen and the temperature is then raised and held at that selected for the test until the substrate oil undergoes catastrophic oxidation which is known by a rapid oxygen uptake. In all cases, the test oil is deliberately contaminated with iron hexoate as an oxidation promoter. In tests of this nature, the oxidation stability of a test lubricant is determined by measuring its induction period, that is, the time required for catastropic deterioration under the above outlined conditions. The longer the induction period, the more stable the lubricant. In tests of this nature lubricants containing an additive of this invention give excellent results.

From the foregoing description it is apparent that the present invention deals with novel compounds and compositions of matter containing these. In general the compounds of this invention have the formulas:

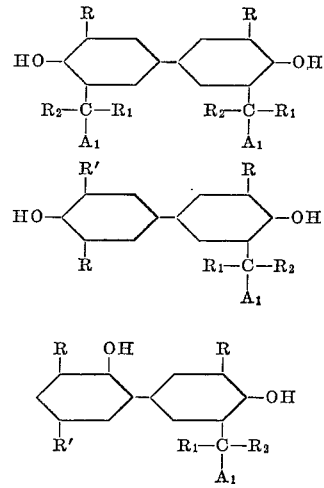

and

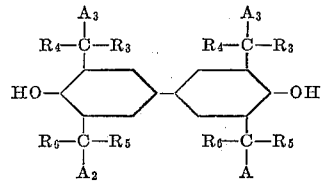

where R is an organic hydrocarbon radical having from one to about 22 carbon atoms, $R_1$ is an alkyl radical having from one to three carbon atoms, $R_2$ is selected from the group consisting of hydrogen and alkyl radicals having from one to three carbon atoms and $A_1$ is an aromatic hydrocarbon radical having from six to about 12 carbon atoms, and R' is R or hydrogen. Thus, the invention consists of both symmetrical and asymmetrical bis phenol compounds where at least one of the benzene rings is substituted in both positions ortho to the hydroxyl group and in which one of the substituents is an alpha alkyl benzyl group.

I claim:

1. 4,4'-bis[2,6-di-($\alpha$-methylbenzyl)phenol].
2. A compound having the formula:

$$\begin{array}{c} \text{HO}-\!\!\bigcirc\!\!-\!\!\bigcirc\!\!-\text{OH} \end{array}$$

with substituents $R_4-C(A_3)-R_3$ and $R_6-C(A_2)-R_5$ on each ring where $R_3$ and $R_5$ are alkyl radicals having from 1–3 carbon atoms; $R_4$ and $R_6$ are groups selected from the class consisting of hydrogen and the methyl group, and $A_2$ and $A_3$ are aromatic hydrocarbon radicals having from 6 to 12 carbon atoms and which is selected from the group consisting of phenyl, diphenyl and alkyl substituted phenyl radicals.

3. The compound of claim 2 where $R_3$ and $R_5$ are methyl radicals and $R_4$ and $R_6$ are hydrogen.

References Cited in the file of this patent

UNITED STATES PATENTS

| | | |
|---|---|---|
| 2,260,739 | Britton et al. | Oct. 28, 1941 |
| 2,276,116 | Taylor et al. | Mar. 10, 1942 |
| 2,368,361 | Jenkins | Jan. 30, 1945 |
| 2,479,948 | Luten et al. | Aug. 23, 1949 |
| 2,668,161 | Beaver | Feb. 2, 1954 |
| 2,900,417 | Filbey et al. | Aug. 18, 1959 |
| 2,947,724 | Ambelang | Aug. 2, 1960 |
| 2,952,662 | Wald | Sept. 13, 1960 |
| 2,954,345 | Filbey | Sept. 27, 1960 |
| 2,960,539 | Rosenwald et al. | Nov. 15, 1960 |

UNITED STATES PATENT OFFICE
CERTIFICATE OF CORRECTION

Patent No. 3,153,098                                         October 13, 1964

James C. Boag

It is hereby certified that error appears in the above numbered patent requiring correction and that the said Letters Patent should read as corrected below.

Column 1, lines 23 to 29, for that portion of the formula reading

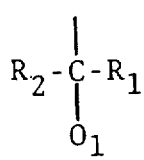      read      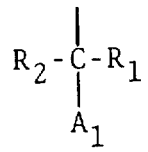

line 38, for "-actyl-" read -- -octyl- --; column 2, line 59, for "for" read -- by --.

Signed and sealed this 5th day of October 1965.

(SEAL)
Attest:

ERNEST W. SWIDER                          EDWARD J. BRENNER
Attesting Officer                      Commissioner of Patents